Aug. 11, 1942.　　　J. A. SCHMITT　　　2,292,849
DAIRY EQUIPMENT CLEANER
Filed Sept. 10, 1941　　　2 Sheets-Sheet 1
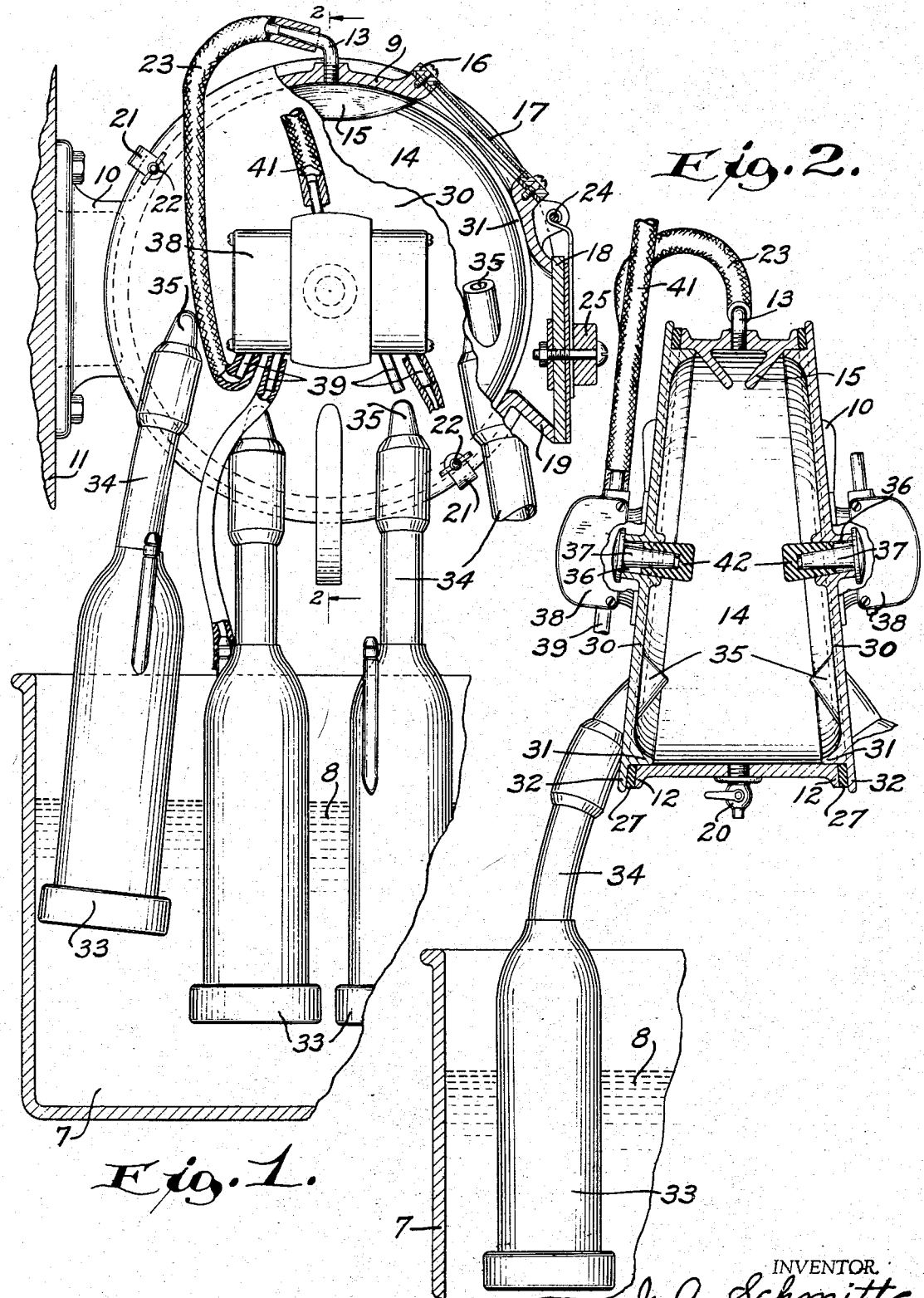
INVENTOR.
J. A. Schmitt
BY
Lieber & Lieber ATTORNEYS.

Aug. 11, 1942.     J. A. SCHMITT     2,292,849
DAIRY EQUIPMENT CLEANER
Filed Sept. 10, 1941     2 Sheets-Sheet 2

INVENTOR.
J. A. Schmitt
BY Lieber & Lieber ATTORNEYS.

Patented Aug. 11, 1942

2,292,849

UNITED STATES PATENT OFFICE 2,292,849

DAIRY EQUIPMENT CLEANER

John A. Schmitt, Waukesha, Wis., assignor to The Universal Milking Machine Company, Waukesha, Wis., a corporation of Wisconsin Application September 10, 1941, Serial No. 410,280

5 Claims. (Cl. 141—1)

The present invention relates generally to improvements in dairy equipment cleaners, and relates more specifically to various improvements in the construction and operation of apparatus for sterilizing or washing the teat cups, connecting tubes, and pail lids of milking machines or the like.

An object of the invention is to provide an improved cleaner for the teat cups, connecting tubes, and pail lids of various types of milking machines or the like, which is simple in construction and efficient in operation.

In my prior Patent No. 2,233,852, granted March 4, 1941, is shown an improved washer for effecting simultaneous cleaning of the teat cups, connecting tubes, and pail lids of various types of milking machines without necessarily disconnecting either the teat cups from the connecting tubes, or the tubes from the pail lids. While this prior apparatus permitted the use of a standard pulsator for the purpose of controlling the flow of cleansing liquid to and from the liquid surge zone, it was necessary to detach the pulsator from the pail lid to which it was normally attached and to mount the removed pulsator upon a special support associated with the washer, thereby somewhat complicating the structure and also resulting in loss of time. This prior washing machine was moreover somewhat difficult to manipulate, because the pail lid was disposed at the lower end or bottom of the cleansing liquid surge receptacle, and the latter had to be lifted bodily when applying and removing the lids; and while the functioning of the prior structure was entirely satisfactory, the machine itself was relatively bulky and could only be used to clean one pail lid at a time.

It is therefore a more specific object of the present improvement to provide a dairy equipment cleaner which overcomes all of the above mentioned objectionable features of my prior cleaner, and which is extremely simple, compact and durable in construction, and which is moreover rapidly and readily manipulable to effect thorough simultaneous washing of several pail lids and of the teat cups associated therewith by means of connecting tubes.

Another specific object of my present invention is to provide an improved sterilizing and washing device for the pail lids, teat cups and connecting tubes of various types of milking machines, wherein the pulsators which are normally associated with the pail lids need not be detached therefrom, but may still be utilized to control the flow of liquid to and from the wash water surging zone.

A further specific object of this invention is to provide an improved teat cup and pail lid washing assemblage in which the lids are applied to upwardly exposed side portions of the surging zone, thus making them readily accessible for application and removal, to and from the tank or housing through which the cleansing liquid is caused to surge.

Still another specific object of the invention is to provide a new and useful dairy equipment washing unit for cleansing pail lids and associated parts, wherein the washing liquid is most effectively applied to the surfaces of the lids and other parts requiring cleansing or sterilization.

An additional specific object of my invention is to provide an improved cleansing unit adapted to simultaneously wash several standard pail lids and associated parts, and which is furthermore adapted to cooperate with lids of different types of milking machines, at the option of the user.

A further additional object of the present invention is to provide an improved dairy equipment washing assemblage which can be readily manipulated by a novice to effectively perform its intended duty, and which can be manufactured and operated at minimum cost.

These and other specific objects and advantages of the invention will be apparent from the following description.

A clear conception of the various features constituting the present improvement, and of the mode of constructing and of operating the improved cleaners in conjunction with several types of milking machine equipment, may be had by referring to the drawings accompanying and forming a part of this specification wherein like reference characters designate the same or similar parts in the various views.

Fig. 1 is a part sectional side elevation of one of the improved dairy equipment cleaners, showing the same cooperating with two standard milking machine pail lids of the type wherein the pail is normally harnessed directly to the cow;

Fig. 2 is a central vertical transverse section through the cleaning apparatus, assembled and being used as in Fig. 1, the section being taken along the line 2—2;

Figures 3, 4:
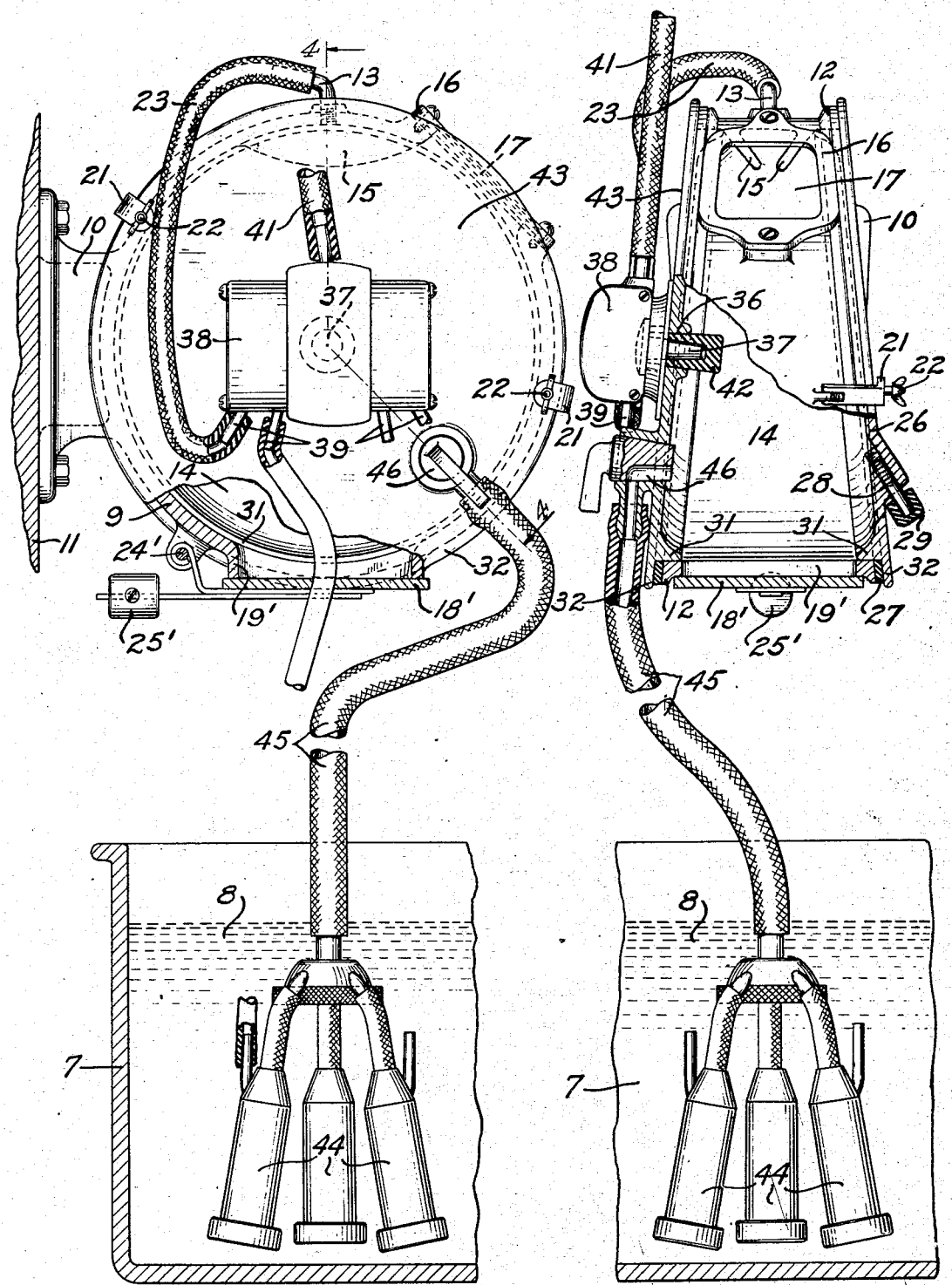
Fig. 3 is another part sectional side elevation of a modified form of the improved dairy equipment cleaner, showing the same cooperating with a pail lid of a milking machine of the type wherein the pail is normally located remote from the cow.
Fig. 4 is a part sectional front view of the cleansing apparatus shown in Fig. 3, the section being taken along the line 4—4.

Although the improvements constituting this invention have been shown and described herein as being cooperable with the lids and associated parts of only several types of relatively standard and well known milking machines, it is not the intent to thereby unnecessarily restrict the scope or utility of the present invention. The term "pulsator" used herein, is intended to include any apparatus adapted to alternately connect a space to a vacuum source such as a pump, and to a zone of high pressure such as the ambient atmosphere, and these pulsators are ordinarily associated with the pail lids of standard milking machines of various types in order to expand and contract the rubber teat cup liners known as inflations. The term "teat cup" as employed herein, is also intended to include both the casings and the inflations of the cups, and these teat cups may be connected with the lids either individually or collectively.

Referring to Figs. 1 and 2 of the drawings, the improved cleansing unit shown therein comprises in general, a source such as a tank 7 containing a supply of sterilizing or washing liquid 8; an annular or circular receptacle or casing 9 having an integral rear suspension bracket 10 for facilitating attachment thereof to supporting structure such as a wall 11 above the liquid supply tank 7, and being provided with oppisite side openings of approximately the same diameter as the interior of the casing bounded by upwardly and inwardly inclined annular pads 12; a pulsator nipple or connection 13 communicating with the uppermost portion of the washing chamber 14 bounded by the casing 9, and having its casing end shielded by inwardly and downwardly inclined guard walls 15 formed integral with and within the casing 9; a sight plate 16 having a transparent window 17, and being detachably associated with the upper front portion of the main casing 9; a one-way gravity actuated flap valve 18 cooperating with an excess liquid overflow duct or spout 19 formed integral with the front medial portion of the fixed casing; a cock 20 disposed at the lowermost portion of the surge casing 9; and two or more pail lid attaching clamps 21 pivotally suspended from the casing 9 near each side pad 12, and each having a clamping screw 22 associated therewith.

The surge casing 9 with its bracket 10, pads 12, guard walls 15, and spout 19 may either be formed as a single integral casting, or of integrally united separate parts; and the pulsator connection 13 is preferably formed as an elbow directed rearwardly and having its free end upwardly and rearwardly inclined in order to facilitate attachment of a pulsator hose 23 thereto. The flap valve 18 of Figs. 1 and 2, which coacts with the casing duct or spout 19, may be suspended from a pivot 24 carried by the casing 9 and may also be provided with a gravity weight 25; and this valve 18 is adapted to be closed against the spout 19 when the chamber 14 is under vacuum, by atmospheric pressure acting on the outer surface of the valve, and to be automatically opened by excess liquid within the chamber 14 when atmospheric pressure is established in this chamber. While the liquid discharge valve 18 has been shown in Figs. 1 and 2 as being associated with a spout 19 located at the front medial portion of the main casing 9, this valve may be disposed at the lowermost portion of the casing 9 as shown in Figs. 3 and 4. Here the modified flap valve 18' coacts with a central lower duct or down-spout 19', and the valve 18' is swingably suspended from a pivot 24' and is counterbalanced and biased toward closed position by means of an adjustable weight 25'. In all other respects, the cleansing unit of Figs. 3 and 4 is the same as that of Figs. 1 and 2, and each of the two types of units is also preferably provided with a blank side plate or closure cover 26 having a sealing ring or gasket 27 and one or more nipples 28 adapted to be closed by means of rubber stoppers or caps 29, and the purpose of which will be later explained.

When the improved sterilizing and washing assemblage is to be used for cleaning milk pail lids of the type wherein the pail is adapted to be harnessed directly to the cow, it is preferable to simultaneously treat two lid, hose and teat cup assemblies, as illustrated in Figs. 1 and 2. In this type of milking machine equipment, each pail lid 30 is provided with an inner centering ridge 31 and a peripheral flange 32 coacting with a sealing gasket 27 of rubber or the like, and has a series of four teat cups 33 attached thereto by means of flexible connecting tubes 34 secured to nipple portions 35. The center of each pail lid 30 has a through opening 36 therein with which a tapered valve 37 coacts, and a standard pulsator 38 such as shown and described in my Patent No. 2,233,852, is normally firmly attached to the outside of each pail lid 30 over the valve 37 thereof. Each of the pulsators 38 is provided with four connections 39 on the side thereof adjacent to the nipple portions 35, and these connections 39 are adapted to be placed in communication with the teat cups 33 during normal milking operation, but when the lids 30 are applied to the washing unit, one of the pulsator connections 39 should be attached to the hose 23. The pulsator 38 also has a hose connection 41 communicating with a source of vacuum such as a pump, and is automatically operable to produce rhythmical alternations of fluid pressure in the chamber 14 by intermittently connecting the hose 23 with the source of vacuum, and with the atmosphere. The central valve 37 and opening 36 of each pail lid 30 should be provided with a sealing plug 42 as shown in Fig. 2, in order to permit the pulsator 38 to function properly; and if only one pail lid assemblage is to be washed, the opposite side opening of the casing 9 should be sealed by a closure cover 26 having the sealing caps 29 applied to the nipples 28 thereof as shown in Fig. 4.

During normal operation of the improved washing unit, when two pail lids 30 of the type shown in Figs. 1 and 2 have been properly applied as depicted, the pulsator 38 which is connected to the pump, will be active, and when the hose connection 41 is opened the active pulsator will intermittently connect the chamber 14 with the vacuum source, and will alternately connect this chamber with the ambient atmosphere. When the chamber 14 is connected to the vacuum source, liquid 8 will be drawn upwardly from the supply tank 7 through the teat cups 33, connecting tubes 34 and inclined nipples 35, into the chamber 14, and due to the inwardly inclined direction of the nipples 35, the liquid will be delivered across the chamber 14 and against the inner side of the pail lid 30 on the opposite side of the casing 9. After a predetermined quantity of liquid 8 has been sucked into the chamber 14, as predetermined by adjustment or pre-setting of the pulsator 38, this pulsator will automatically place the hose 23 in communication with the atmosphere, thereby breaking the vacuum in the chamber 14 and establishing atmospheric pressure therein. This admission of air to the chamber 14 will cause the excess liquid 8 to flow back to the supply tank 7, both through the nipple portions 35, connecting tubes 34 and teat cups 33, and through the spout 19. The valve 18 which coacts with this spout 19 will be maintained tightly closed by external air pressure while the chamber 14 is being subjected to vacuum, but when this chamber is subjected to atmospheric pressure, the valve 18 will automatically open and permit free escape of excess liquid 8 from the chamber 14. This alternate upward admission or surging of liquid into the chamber 8, and downward flow of the liquid therefrom, will continue until the washing operation has been completed, whereupon the hose 41 may be closed off, the drain cock 20 may be opened to permit escape of trapped liquid, and the pail lids 30 may be removed upon release of the clamps 21. Obviously either two pail lid assemblages may be thus washed simultaneously, or one lid assembly may be washed by closing the opposite casing opening with a blank cover 26; and the guard walls 15 effectively prevent undesirable splashing of liquid 8 into the connection 13 when the liquid is projected upwardly along and against the inclined inner surfaces of the lids 30.

When the improved sterilizing and washing assemblage is to be used for cleaning milk pail lids of the type wherein the pail is normally located remote from the cow, it may be preferable to treat only a single lid having either one or two hose and teat cup assemblies associated therewith, at a time, as illustrated in Figs. 3 and 4, and to close the opposite casing opening with a blank closure plate 26. In this type of milking machine equipment, the pail lid 43 is likewise provided with an inner centering ridge 31 and a peripheral flange 32 coacting with a sealing gasket 27, and the lid 43 has either one or two clusters of teat cups 44 suspended therefrom by means of relatively long tubular connections 45. The end of each connection 45 adjacent to the lid 43, is connected to a shut-off valve 46, and this type of pail lid 43 is also provided with a central opening 36 and valve 37, and with a pulsator 38 disposed over the valve 37. When the pail lid 43 is applied to the washer casing 9 with the aid of the clamps 21, it should also be provided with a central sealing plug 42 for the opening 36, and the proper pulsator connections should be attached to the hoses 23, 41 as shown. If so desired, two of the modified pail lid assemblages may be applied to the washer simultaneously or several additional teat cup and tube assemblages may be applied to the nipples 28 of the cover 26.

During normal operation of the washer when a pail lid 43 such as shown in Figs. 3 and 4 has been properly applied, the pulsator 38 after being connected to the vacuum source through the hose 41 will again intermittently connect the chamber 14 with the source of vacuum, and will alternately connect this chamber with the ambient atmosphere. Whenever the chamber 14 is connected to vacuum, liquid 8 will be drawn upwardly from the supply tank 7 through the teat cups 44, connecting tube 45 and valve 46, and will be delivered into and across the chamber 14 toward the nipples 28 on the opposite side. After a predetermined quantity of liquid 8 has thus been introduced into the chamber 14, the pulsator 38 will automatically break the vacuum and will admit atmospheric air, whereupon some liquid 8 from the chamber 14 will flow back to the supply tank through the valve 46, tubes 45 and teat cups 44, while the excess liquid will pass directly through the spout 19' and past the lower valve 18'. This cycle of operations will be repeated until thorough cleansing has been effected, whereupon the pail lid 43 may be quickly removed from the washer by merely releasing the clamps 21; and if additional tubes 45 have been applied to one or more of the nipples 28, these may also be quickly removed.

It is to be noted, that while it is preferable due to the inclined disposition of the pads 12 and of the nipple portions 35 of the pail lids 30 to position these lids 30 as in Figs. 1 and 2; it may be desirable when washing and sterilizing pail lids 43, to position the valves 46 thereof further above the lower portion of the chamber 14, and this can readily be done since the lid ridges 31 are circular and coact with circular openings in the annular pads 12 of the casing 9. This construction of the parts will permit the lids 30, 43 to be turned to any desired position before being clamped to the casing 8, and the same is true of the closure cover 26. In any event, the guard walls 15 will prevent liquid from reaching the connection 13, and the washing action within the chamber 14 may be viewed through the window 17. Any suitable type of clamp 21 may also be used, and these clamps may be disposed otherwise than as shown.

From the foregoing detailed description it will be apparent that the present invention provides an improved unit for most effectively cleansing standard pail lid and teat cup assemblages of various types, which is extremely simple, compact and durable in construction, and which is moreover readily manipulable and performs its duty automatically. The improved washing assemblage is very flexible in its adaptations, and can be manufactured and operated at moderate cost, and by virtue of the fact that the pail lids are applicable to upwardly facing side pads 12, these lids can be conveniently applied, removed and adjusted. The pulsators 38 which are normally attached to the lids, need not be removed therefrom, and the inclined disposition of the lids enhances the washing action especially when pail lids 30 are applied to the washer. The washing action on the inside of the lid 30, 43 may also be materially enhanced when only one of these lids is being cleansed, by attaching a hose to the nipple 28 associated with the cover 26, and this nipple 28 will then deliver the wash water against the pail lid at the opposite side of the washer, by virtue of the inclined disposition of the nipple 28. The inclination of the pads 12 may be varied throughout a considerable range, and this inclination also serves to prevent the valves 46 from dropping out of place. The annular or circular formation of the main casing 9 with its large alined opposite side openings, is important since this construction reduces the washer to most compact form, and also facilitates application and removal of the lids. The entire cleaning unit may be readily suspended from a wall 11 or other support, and occupies very little space considering its cleaning capacity.

It should be understood that it is not desired to limit this invention to the exact details of construction or to the precise mode of use, herein shown and described, for various modifications within the scope of the claims may occur to persons skilled in the art.

I claim:

1. In a device for washing milking machine assemblies each consisting of a pail lid with a pulsator normally applied thereto and having the teat cups suspended from the lid by the connecting tubes so that the cups may be submerged in a supply of cleansing liquid located beneath the device, a fixed casing forming a liquid reception chamber and having a side opening and a lower outlet, means for detachably attaching a pail lid and pulsator assembly to said casing at said side opening, means for connecting the lid supported pulsator with an upper portion of said chamber, and a valve associated with said casing outlet for permitting escape of excess liquid from said chamber to the supply source only when the chamber is exposed to atmospheric pressure, said pulsator being operable to initially connect said chamber with a source of vacuum and to subsequently expose the chamber to atmospheric pressure during each successive pulsation thereof whereby liquid from the supply source is initially drawn into said chamber through the teat cups and connecting tubes and is subsequently permitted to return to said source from within said chamber through the connecting tubes and teat cups while excess liquid gravitates past said valve.

2. A device as per claim 1, characterized thereby, that the fixed casing is formed as an annulus having an approximately horizontal axis, and with the side opening approximately the same diameter as that of the liquid reception chamber.

3. A device as per claim 1, characterized thereby, that the casing has opposite side openings each adapted to receive a pail lid assemblage in such position that the cleansing liquid admitted to the chamber through each lid will be directed toward the inside of the other lid.

4. A device as per claim 1, characterized thereby, that the suction connection from the pulsator to the interior of the liquid reception chamber is provided with a guard for preventing flow of liquid from within this chamber to the pulsator.

5. A device as per claim 1, characterized thereby, that the casing has opposite side openings each provided with an annular seating pad for a pail lid, and that these opposed pads have plane seating surfaces inclined toward each other approaching the top of the casing.

JOHN A. SCHMITT.